United States Patent
Mirowski (10) Patent No.: US 7,433,851 B2
(45) Date of Patent: Oct. 7, 2008

(54) SYSTEM AND METHOD FOR INFERRING GEOLOGICAL CLASSES

(75) Inventor: Piotr Mirowski, New York, NY (US)

(73) Assignee: Schlumberger Technology Corporation, Ridgefield, CT (US)

( * ) Notice: Subject to any disclaimer, the term of this patent is extended or adjusted under 35 U.S.C. 154(b) by 4 days.

(21) Appl. No.: 10/538,961

(22) PCT Filed: Jan. 26, 2004

(86) PCT No.: PCT/GB2004/000304

§ 371 (c)(1),
(2), (4) Date: Jun. 14, 2005

(87) PCT Pub. No.: WO2004/066060

PCT Pub. Date: Aug. 5, 2004

(65) Prior Publication Data

US 2006/0074825 A1    Apr. 6, 2006

(30) Foreign Application Priority Data

Jan. 24, 2003    (GB) .................................. 0301664.9

(51) Int. Cl.
*G06E 1/00*    (2006.01)
*G06E 3/00*    (2006.01)
(52) U.S. Cl. .............................. 706/19; 706/20; 706/21; 367/25; 703/10
(58) Field of Classification Search .................... 706/19, 706/20, 21; 367/25; 703/10
See application file for complete search history.

(56) References Cited

U.S. PATENT DOCUMENTS

| 5,444,619 | A  | * | 8/1995  | Hoskins et al. .................. 702/13 |
| 5,504,479 | A  | * | 4/1996  | Doyle et al. ................... 340/854.9 |
| 5,566,270 | A  |   | 10/1996 | Albesano et al. |
| 5,862,513 | A  | * | 1/1999  | Mezzatesta et al. ............. 702/9 |
| 6,011,557 | A  |   | 1/2000  | Keskes et al. |
| 6,438,493 | B1 | * | 8/2002  | West et al. ...................... 702/2 |
| 6,442,487 | B2 | * | 8/2002  | Kim .............................. 702/6 |
| 6,466,908 | B1 | * | 10/2002 | Baggenstoss ................ 704/256 |
| 6,560,540 | B2 | * | 5/2003  | West et al. ..................... 702/14 |
| 6,847,895 | B2 | * | 1/2005  | Nivlet et al. .................... 702/2 |
| 7,062,072 | B2 | * | 6/2006  | Anxionnaz et al. .......... 382/109 |
| 2002/0099504 | A1 | * | 7/2002 | Cross et al. ..................... 702/2 |
| 2002/0183930 | A1 | * | 12/2002 | Plona et al. .................... 702/6 |
| 2006/0074825 | A1 | * | 4/2006 | Miroswki ..................... 706/20 |

FOREIGN PATENT DOCUMENTS

JP    20002769 A    1/2000

OTHER PUBLICATIONS

Bishop, Neural networks for pattern recognition, Oxford Press 1995, pp. 332-384.

(Continued)

*Primary Examiner*—Joseph P. Hirl
*Assistant Examiner*—Adrian L Kennedy
(74) *Attorney, Agent, or Firm*—Steven Gahlings, Esq.; James McAleenan, Esq.; Jody Lynn DeStefanis, Esq.

(57) ABSTRACT

A system for inferring geological classes from oilfield well input data is described using a neural network for inferring class probabilities and class sequencing knowledge and optimising the class probabilities according to the sequencing knowledge.

14 Claims, 5 Drawing Sheets

OTHER PUBLICATIONS

Carr, Log-linear models, Markov chains and cyclic sedimentation Journal of Sedimentary Petrology 1982, vol. 52(3) pp. 905-912.

Eidsvik et al, Estimation of geological attributes from a North Sea well log an: application of hidden Markov chains, Norges Teknisk—Naturvitenskapelige Universitet. Submitted for publication in 2002.

Gingerich, Marchov analysis of cyclic alluvial sediments, Journal of Sedimentary Petrology 1969, vol. 39, pp. 330-332.

Hall et al, Estimation of critical formation evaluation parameters using techniques of Neurocomputing, Society of Professional Well Log Analysts Annual Logging Symposium 1995, 36th, France 1995, Transactions, p. PPP1-PPP12.

Jiang et al, Segmentation of seafloor sidescan imagery using Markov random fields and neural networks, IEEE 1993 vol. 3, Conference Oceans '93. Engineering in harmony with ocean proceedings. III456-III461.

Miall, Markov chain analysis applied to an ancient alluvial plain succession, Sedimentology 1973, vol. 20, pp. 347-364.

Padron et al, A hidden Markov model approach for lithology identification from logs, Institut National des Telecommunications Evry, Universidad. Central de Venezuela, Caracas, Universite Pierre et Marie Curie, Paris, Submitted for the 3rd Conference on Artificial Intelligence Applications to the Environmetnal Science, 83rd Annual Meeting of American Meterological Society 2003.

Powers et al, Improved methodology for using embedded Markov chains to describe cyclical sediments, Journal of Sedimentary Petrology 1982, vol. 52(3), pp. 913 to 923.

Renals et al, Connectionist probability estimators in HMM speech recognition, IEEE Transaction on Speech and Audio Processing, 1994, vol. 2, No. 1, part II, pp. 1961 to 174.

Schumann, Hidden Markov models for lithological well log classification, Freie Universitat Berlin, Presented at the Annual Conference of the International Association for Mathematical Geology, 2002.

Srivastava, Hybrid Neural Network/HMM Based Speech Recognition, Department for Electrical and Computer Engineering, Mississippi State University, 2001.

\* cited by examiner

SYSTEM AND METHOD FOR INFERRING GEOLOGICAL CLASSES

FIELD OF THE INVENTION

This invention relates the enhancements of neural network-assisted reservoir characterization techniques for geological classification from measured input data.

According to the present invention, the terms "measured input data" or "INPUT DATA" refers to, in particular, downhole logs. The set of logs used in the testing of the method of the invention includes gamma ray (GR), sonic slowness (DT), thermal neutron porosity (NPHI), bulk density (RHOB) and true resistivity (RT), all measured at same depth for each sample, and at a constant sampling distance. However, INPUT DATA are not restricted to samples at a single depth. Alternatively, attributes that represent, for example, sliding window averages or other statistics taken over a depth range in the neighborhood of the depth of interest, can be constructed. 2D image logs (e.g., FMI) or 3D seismic cubes are also encompassed.

According to the present invention, the terms "geological classes" or "CLASSES" refers to, principally, the rock facies (lithofacies) or the reservoir rock types. However, any other discrete classification of geological features (e.g. petrophysical properties) is possible.

PRIOR ART

Rock facies class prediction by neural network processors applied to downhole logs is an existing method developed in the nineteen nineties which gave rise to several publications [1]. For instance, it has been implemented by an ENI AGIP E&P team, and integrated in a joint development project into the product RockCell™ within the Schlumberger™ GeoFrame™ oilfield interpretation software platform.

For rock facies estimation, a set of single-channel log curves are selected. Typical logs used are gamma ray (GR), sonic slowness (DT), thermal neutron porosity (NPHI), and bulk density (RHOB), but this list is not limited. New attributes can also be generated from existing logs in order to reveal additional features in the logs.

A current limitation in analyzing geological measured data such as downhole logs, is that their relationship to classes such as rock facies is not obvious. In each borehole, there are unknown local factors that may affect the data in unexpected ways. It can thus be risky to classify on a simplified theoretical analysis or by data clustering. There is a need for a method to identify associations between input data and to build implicit complex functional relationships. A "learn from examples" method is more preferred to building an expert system. The discovered methods would then be used to predict the classes and their associated probabilities.

An Artificial Neural Network (ANN) scheme has been developed to implement learning by example as applied to downhole geological classification. Neural networks can "learn" specific computation schemes. Once trained, a neural network can find acceptable solutions on any set of data referring to the learned schemes. This gives artificial neural networks an ability to generalize from training experience (see [12]). Unlike analytical approaches such as statistics, neural networks require no explicit computational model, and are not limited by a lack of normality or the non-linearity of the physical phenomenon. As a consequence, they "learn" relationships between data that may be hard to discover with analytical methods.

The behavior of a neural network is defined by its architecture. This architecture consists of the way its neurons (individual computing elements) are connected and by strength (weight) of those connections. Each neuron performs a weighted sum (linear combination) of its inputs, then applies an almost non-linear activation function, to finally produce an output. The resulting output of a given neural layer is forwarded to the next layer and so on through the network. In other words, neural networks plainly perform a massively parallel set of elementary computations. Whereas the weights vary the strength of connections from one node to another, the sigmoidal activation function provides the highly non-linear property of neural data processing.

The main advantage of those neural nets is their learning capability. During the learning phase, given a training set of data, the interconnection weights are gradually adjusted so as to stabilize the network's output, and, in the case of the supervised learning, to minimize the mean square error between the effective output and the desired one. The preferred implementation of the NN is a supervised feed-forward, multi-layer perceptrons trained with the back-propagation algorithm.

Methods and techniques used today are able to classify without the a priori knowledge of classes sequencing. The prediction operates on geological input data sample-by-sample, and produces for each input pattern the probabilities of the most likely classes.

However, this system sometimes fails in its predictions. One of its main limitations is that it does not honour geological prior knowledge. Some of the predictions fail due to the fact that geologically improbable classes transitions are often observed.

Sedimentologists have observed that the vertical and lateral sequence of geological facies[1] seen in outcrop and in the subsurface are not random. Since the stratigraphic layering in the earth represents successive time of deposition, the rock record actually represents a time series of events. Since the normal neural net techniques make sample-by-sample predictions, they do not consider previous states of prediction (e.g., the facies predicted at location $X_{n-1}$, which implies $t_{n-1}$, constrains the prediction at location X) and they fail to take advantage of likely non-random transitions between lithology or facies. Geology can provide strong constraints on the prediction of stratigraphic successions. Sedimentologists have long invoked Markov models for analyzing the vertical and lateral sequences [2, 3, 4, 5]. Therefore, using a Markov scheme using geological prior information of rock facies transition probabilities seems a fruitful way to improve the prediction of the neural network scheme.

Systems for speech recognition, integrating a neural network and a Hidden Markov Model (HMM), are known from the state of the art. HMMs are used as a major approach in the majority of continuous speech recognition systems. They provide an accurate and reliable framework for segmentation and classification of speech. HMM states can stand for the phone classes, $c_i$ (e.g., phonemes) to be identified, whereas the HMM observation sequence for the acoustic vectors y (e.g., a combination of cepstral and energy acoustic parameters). As a consequence, the state sequence $X=x_1, x_2, \ldots, x_T$ of length T can be considered as the, "sentence" to be recognized due to the recorded and discretized acoustic observation sequence $Y=y_1, y_2, \ldots, y_T$.

Facies sequences have been considered as analogous to the phoneme sequences in the speech recognition methods. The HMM and its stochastic behavior represent the allowed or forbidden transitions between geological classes and their associated probabilities, and the geological input data are analogous to the acoustic observation vectors used during the speech recognition process.

The HMM technology has already been applied to lithofacies classification from well logs. Publications [6], [7] and [8] describe the building, training and application of a Hidden Markov Model to estimate the lithology of uncored boreholes based on key learning data sets where the lithology is known. In those methods, the lithofacies sequence stands for the consecutive states of the HMM, and the log data for the observations. Those methods do not rely on the use of a neural network. This means they are able to model the stochastic character of rock facies transitions and the rock facies sequences. However, they perform poorly while modeling the non-linear relationship between logs and rock facies, as they do not benefit from the complex neural network architectures and computation schemes.

In the papers [9] and [10], and in several patents concerning speech recognition, such as [11], an interesting approach to classify speech phonemes has been developed by the use of hybrid models mixing both HMM and ANN. Those approaches enable speech recognition systems to cope with the strong statistical assumptions of the HMMs.

Applying a feed-forward neural network to the input data y can give us estimates of the conditional posterior probabilities $p(x_i|y)$ of each class $x_i$, given the current input vector y.

Those class-conditional-posterior probabilities must sum to one, and therefore need to be normalized. However, a HMM needs the conditional prior probabilities $p(y|x_i)$. Assuming there are enough training data and that the training does not get held up in poorly performing local minima, the feed-forward neural network is able to approximate the prior probabilities thanks to Bayes' rule. Indeed, $p(y|x_i)=p(x_i|y) \times p(y)/p(x_i)$. The prior probability distribution of classes is context-dependent but can be estimated by counting the classes occurence of classes in the learning set, or by introducing prior knowledge. The prior probability of the observation vector can be discarded as for each time step; it is independent of the phone class.

The HMM and observation sequence finally provide, thanks to the Viterbi algorithm, the most likely state sequence which caused the observed acoustic data sequence.

REFERENCES CITED

[1] Hall J., Scandella L. (1995). "*Estimation of Critical Formation Evaluation Parameters Using Techniques of Neurocomputing*", Society of Professional Well Log Analysts Annual Logging Symposium, 36th, Paris, France, 1995, Transactions, p. PPP1-PPP12.
[2] Gingerich, P. D. (1969). "*Markov analysis of cyclic alluvial sediments.*" Journal of Sedimentary Petrology 39: 330-332.
[3] Miall, A. D. (1973). "*Markov chain analysis applied to an ancient alluvial plain succession.*" Sedimentology 20: 347-364.
[4] Carr, T. R. (1982). "*Log-linear models, markov chains and cyclic sedimentation.*" Journal of Sedimentary Petrology 53(2): 905-912.
[5] Powers, D. W., Easternling, R. G. (1982). "*Improved methodology for using embedded Markov chains to describe cyclical sedimentation.*" Journal of Sedimentary Petrology 52(3): 913-923.
[6] Eidsvik, J., Mukerji, T, Switzer P. (2002). "*Estimation of geological attributes from a North Sea well log: an application of hidden Markov chains*", Norges Teknisk—Naturvitenskapelige Universitet, submitted for publication in 2002.
[7] Schumann A. (2002). "*Hidden Markov Models for Lithological Well Log Classification*", Freie Universitat Berlin. Presented at the Annual Conference of the International Association for Mathematical Geology, 2002.
[8] Padron, M., Garcia-Salicetti, S., Barraez, D., Dorizzi, B., Thiria, S. (2002). "*A Hidden Markov Model Approach For Lithology Identification From Logs*", Institut National des Telecommunications Evry, Univesidad Central de Venezuela Caracas, Universite Pierre et Marie Curie Paris. Submitted for the 3rd Conference on Artificial Intelligence Applications to the Environmental Science, $83^{rd}$ Annual Meeting of American Meteorological Society, 2003.
[9] Srivastava S. (2001). "*Hybrid Neural Network/HMM Based Speech Recognition*", Department for Electrical and Computer Engineering, Mississippi State University, 2001.
[10] Renals, S., Morgan, N., Bourlard, H., Cohen, M., Franco, H. (1994). "*Connectionist Probability Estimators in HMM Speech Recognition*". IEEE Trans. Speech and Audio Processing, 2:161-175, 1994.
[11] Albesano, D., Gemello, R., Mana, F., (1996). "*Speaker independent isolated word recognition system using neural networks*", U.S. Pat. No. 5,566,270, Oct. 15, 1996.
[12] Bishop C. (1995). *Neural Networks for Pattern Recognition*, Oxford Press 1995.

SUMMARY OF THE INVENTION

The starting point of this invention consists of enhancing the neural networks algorithms to make their predictions more accurate and robust in oilfield applications.

In a first aspect, the invention concerns a system for inferring geological classes from oilfield well input data comprising a neural network for inferring class probabilities, characterized in that said system further comprises means for integrating class sequencing knowledge and optimising said class probabilities according to said sequencing knowledge.

Preferably, the means for integrating class sequencing knowledge and optimising said class probabilities according to said sequencing knowledge comprises a hidden Markov model.

In a second aspect, the invention concerns a method for inferring geological classes from oilfiled well input data, comprising the following steps:—inferring class probabilities with a neural network; and—integrating class sequencing knowledge and optimising said class probabilities according to said sequencing knowledge.

Preferably, integrating class sequencing knowledge and optimising said class probabilities according to said sequencing knowledge is achieved according to a hidden Markov model.

Advantageously, the invention relates to a system and method for inferring geological classes from single-channel oilfield input data by applying hybrid neural network hidden Markov models classifiers.

The geological classification is inferred using supervised neural networks that are applied to the input data and that predict the associated classes. The vertical class transition constraints are learned within a Markov class transition table and a prior class distribution, which are then reused during the estimation of the classes. This optimizes the predicted class curve and honours geological prior knowledge.

This invention relates the enhancements of artificial neural network (ANN) reservoir characterization techniques for geological classification. Supervised neural network classifiers can be applied to downhole logs to automatically predict lithology or other classes in boreholes. However, ANN systems sometimes infer geologically incorrect vertical (stratigraphic) class transitions within a borehole. The root cause of these errors is the fact the networks analyze and predict the output classes sample-by-sample, without taking the whole borehole sequence of classes into account. Improving the prediction of lithofacies from downhole logs is solved by the system and method of the present invention. In essence, they do not take into account local information that is commonly important in stratigraphic rock sequences. Geological transitions are commonly not random, but predictably sequenced.

The system integrates an a priori knowledge of class sequencing and of class probability distribution in the neural network predictor. It combines a supervised back-propagation, feed-forward neural network architecture with a Hidden Markov Model module into a complex hybrid neural processing chain. The second processing step optimizes the class, stratigraphic sequence. Instead of simply choosing, for each set of input data the class that is the most probable, the chosen class is the one which has both a reasonable occurrence probability given the input data pattern and a reasonable occurrence probability given the previous estimated class. Such a choice governed both by class transition and a posterior class observation probability is implemented through the Viterbi algorithm.

These and other features of the invention, preferred embodiments and variants thereof, possible applications and advantages will become appreciated and understood by those skilled in the art from the following detailed description and drawings.

DRAWINGS

FIG. 1 is a block-diagram of the training of the hybrid ANN-HMM classification system. The training set consists of INPUT DATA across several wells and associated core information. The normalization of INPUT DATA and the generation of additional attritutes is optional (dotted arrows). The construction of the HMM during the training phase is optional as well, if it is not essential to compute it for the training data set.

MODE(S) FOR CARRYING OUT THE INVENTION

The Hybrid ANN/HMM of an example of the invention is composed of two different components, which are the ANN posterior CLASS probability estimator, and the HMM, comprising only a CLASS transition table and a CLASS probability distribution. In the present example those components are trained separately during the training phase of the system, as they do not need to interfere with one another during the learning step. They are also applied separately during the estimation step.

In the following single steps and components of the example of the invention are described in greater details making reference to FIG. 1 to 5.

1. Data Choice and Input

Processing of the INPUT DATA is done on a sample-by-sample basis, and therefore the CLASS probabilities are estimated for each sample.

1.1. Borehole Choice (See Step 1.1 to 1.3 on FIG. 1 and 2.2 on FIG. 2)

Figure 1:
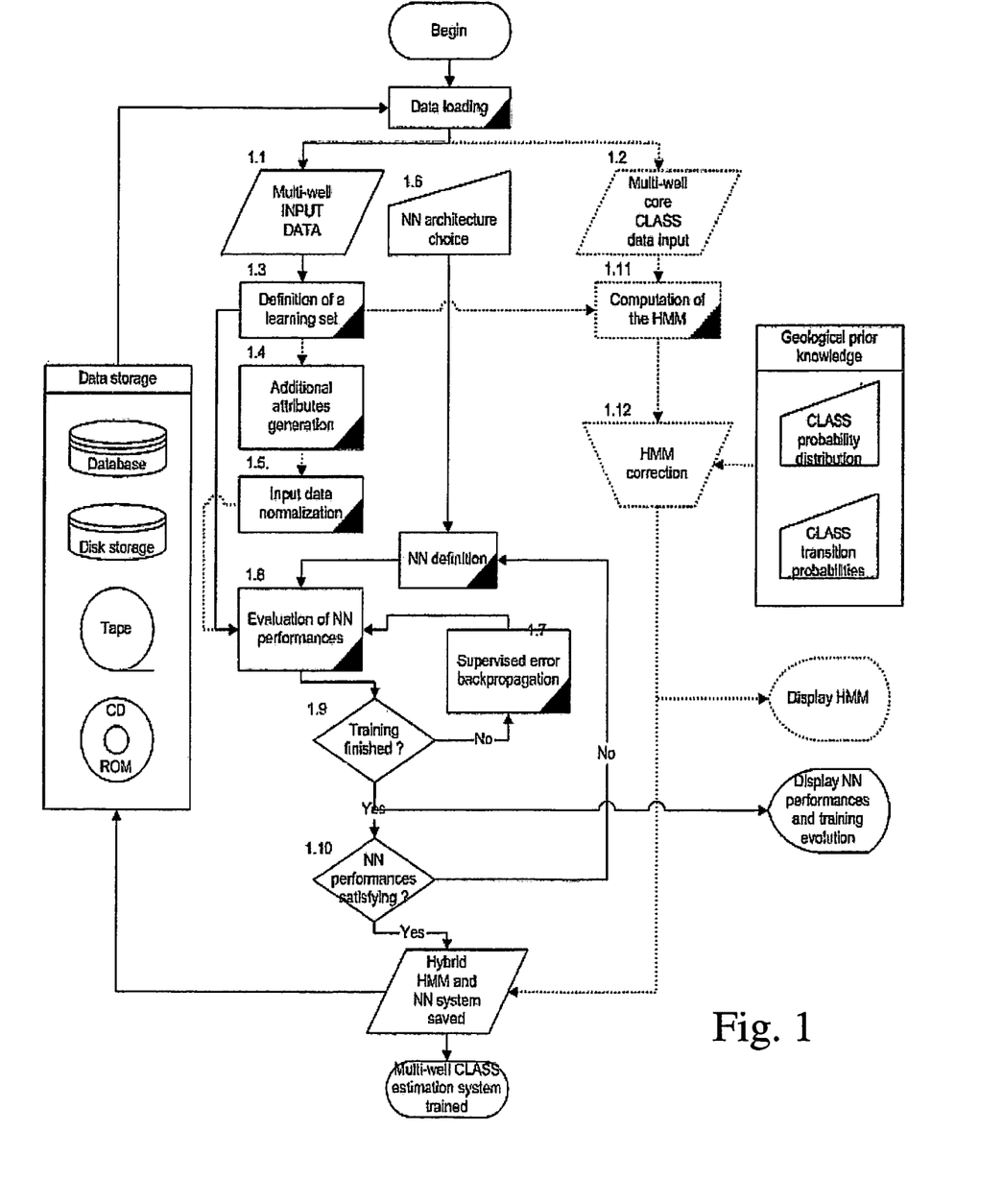
Figure 2:
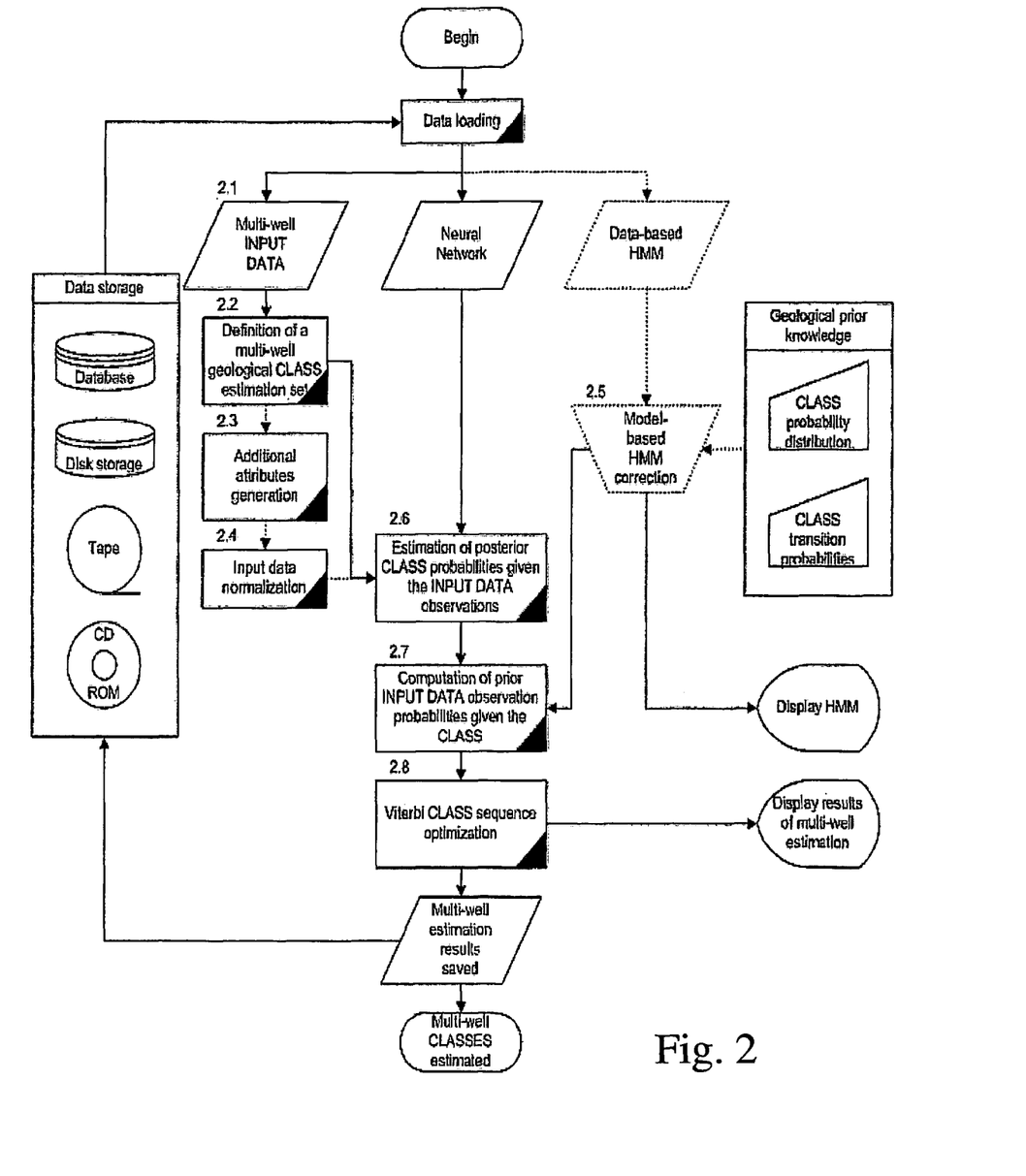
FIG. 2 is a block-diagram of the estimation of the hybrid ANN-HMM lithofacies classification system on uncored boreholes by applying the system to well logs. The normalization of INPUT DATA and the generation of additional attritutes is optional (dotted arrows). As for the HMM, one can load an existing HMM from the data storage system and/or manually define it on the basis of the geological prior knowledge.

Both the learning and the estimation of the Hybrid HMM/ANN classification system can be done on several wells, as long as they share the same geological INPUT DATA and properties. This system is by consequence designed to propagate the knowledge of the physical and statistical relationships between INPUT DATA and CLASSES, as measured in one or several wells, to the whole set of boreholes within an oilfield.

If one or more INPUT DATA curves are missing, they can be estimated based on available data. One can for instance integrate synthetic logs so as to perform rock class estimation.

1.2. Input Data Choice (See Step 1.1 on FIG. 1 and 2.1 on FIG. 2)

The following section log curves are used as INPUT DATA. For the purposes of testing and validating the method outlined here, the set of logs used includes gamma ray (GR), sonic slowness (DT), thermal neutron porosity (NPHI), and bulk density (RHOB), all measured at same depth for each sample, and at a constant sampling distance. A regression is often done on those data by taking several samples above and several samples below the depth of interest.

However, any set of 1D, 2D or 3D geological or geophysical information is suitable for this system. 1D depth-oriented attributes are extracted from the existing information. Alternatively sliding window statistics can be extracted at the neighborhood of the depth of interest, and this can be done for instance on 2D open borehole microresistivity images or 3D seismic cubes.

1.3. Training Data Set and Cross-Validation Data Set (See Step 1.3 on FIG. 1)

The learning data includes both INPUT DATA and core or geologist-defined corresponding CLASSES zonation. This CLASSES zonation of the INPUT DATA is considered as the desired goal which has to be attained by the Hybrid HMM/ANN classification system.

The supervised training of the ANN component is done for each sample of the INPUT DATA, and for as many epochs as necessary, until a global mean square error between the desired outputs and the actual outputs is satisfactory. A second error, the so-called cross-validation error, is also computed on a different data set, not taken into account when training the ANN. This monitors the generalizing abilities of the ANN, preventing the ANN from learning the training data set "by heart". Usually, the training stops when the cross-validation error starts to increase.

The separation between training set and cross-validation set is done on the basis of random choice. The total percentage of data being selected for the cross-validation set is chosen during the ANN architecture choice step, for instance p=50%. Then, for each sample of the INPUT DATA set, that sample is randomly attributed to the training set or the cross-validation set according to the probability p.

1.4. Additional Attributes Generation (See Step 1.4 on FIG. 1 and 2.3 on FIG. 2)

Under certain circumstance, for example if the INPUT DATA does not contain, on a localized sample-by-sample basis, enough spatial information which could help to discriminate among CLASSES, additional information may be extracted from existing data, e.g. seismic data or logs. That information can for instance, show the evolution of the INPUT DATA curves, the energy contained in the curves or the smoothed low-frequency component of the curves. In order to obtain such information one can apply a set of gradients to the INPUT DATA curves, or extract low frequencies using for example the Fast Fourier Transform, or approximate the INPUT DATA curves with Polynomial curves on small windows, i.e. a subset of the data.

This additional attributes generation is done both for the learning data set and for the estimation data set.

1.5. Log Data Normalization (See Step 1.5 on FIG. 1 and 2.4 on FIG. 2)

The generalization performance of the ANN can be enhanced using a pre-processing step consisting of normalizing of the data. This optional step can consist of one or more of the following computations: Mean—Standard Deviation Normalization, Principal Component Analysis (with retention of the principal components which account for 95 or 98% of the data), Mininum—Maximum Normalization or other known methods for data normalization.

2. Neural Network Component

Several architectures, training algorithms, and methods of implementation are possible for the neural network. In the present example the component is a feed-forward MLP (Multi-Layer Perceptron), with an input layer (one neuron per log data attribute), one or several hidden layers, and an output layer (one neuron per CLASS). The outputs $O=(o_1, o_2, \ldots o_N)$ of the ANN have to be the probabilities of each CLASS, according to the current INPUT DATA, and as a consequence have to equal 1 and each belong to the interval [0, 1].

2.1. Choice of the Neural Network Architecture (See Step 1.6 on FIG. 1 and FIGS. 5a, 5b)

A preferred embodiment of this method is the three-layered neural network, with: sigmoid activation functions; bias; as many nodes on the first layer as there are log attribute inputs, for instance 4, then 10 nodes on the first hidden layer and 10 nodes on the second hidden layer. The number of nodes on the output layer is the same the number of CLASSES.

Figure 5A:
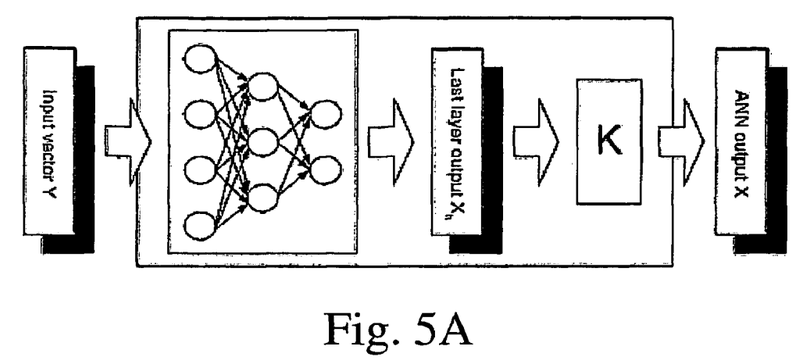
FIG. 5a shows a particular ANN architecture where the neural network integrates a Kalman-trained matrix K.

As illustrated in FIG. 5A, an additional linear matrix K can be added to the ANN after the output layer of the neural network. In this case, the last neural layer does not need to have as many nodes as there are CLASSES, but the linear matrix K has to be correctly sized and performing the following operation: $X=K\,Xh$, where X is a vector of size N (N being the number of CLASSES), Xh is a vector of size Nh coming out from the last neural layer, and K is a matrix of size N×Nh.

Figure 5B:
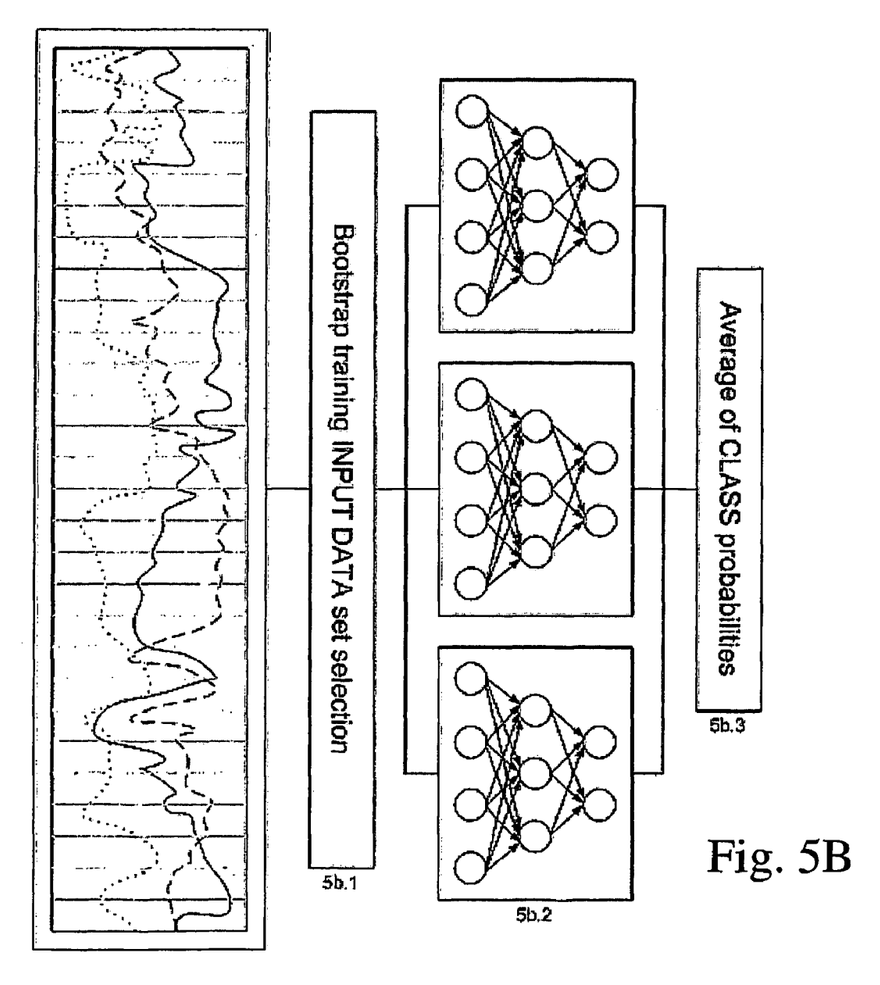
FIG. 5b illustrates the concept of neural network expert committee.

Independent of which ANN architecture is retained, several ANN modules can be combined into a neural network "expert committee" as shown on FIG. 5b, step 5b.2.

After selection of the ANN architecture the neural networks are trained.

2.2. Training the ANN (See Step 1.7 to 1.10 on FIG. 1)

2.2.1. Evaluation of the Network Performances at Each Step (See Step 1.8 on FIG. 1)

Evaluation is realized by computing the global RMSE (Residual Mean Square Error) between the desired outputs as provided by the training or the cross-validation data set, and the actual outputs of the ANN. Two curves corresponding to that training and cross-validation error are displayed and monitored during the training process.

2.2.2. Error Back-Propagation (See Step 1.7 on FIG. 1)

The supervised training of the neural network is performed by the Error Back-Propagation, and the algorithm used can be, for instance, Gradient Descent with Adaptative Learning Rate and Momentum. This means that the difference between the expected CLASS probability as provided by the training data set, and the actual current output of the ANN, is propagated backwards through the ANN and the neural weights are accordingly updated. The Adaptative Learning Rate means that this correction is proportional to a learning rate which is tuned accordingly to the evolution of the global RMSE. The Momentum means that a term corresponding to the total sum of the neural weights of the network is added to that global error, with the aim of avoiding the values of those weights increasing too much.

2.2.3. ANN Expert Committees (See FIG. 5b)

Instead of one ANN, one can run several ANN and the average of their outputs (see step 5b.3) can be taken as CLASS probability. The training of each ANN module of that committee is done using to a bootstrap procedure (see step 5b.1), which includes the steps of slightly altering the training set for each ANN (different partition of INPUT DATA samples between the training set and the cross-validation set), and randomly initializing the neural weights of the ANN before training. The generalization abilities of the ANN are then enhanced.

2.2.4. Training of the K Matrix by Kalman Filtering (See FIG. 5a)

In cases described above where a linear matric is used to associated the last layer output with the CLASS output, this K matrix is trained in addition to the neural network.

This K matrix is trained in the following way:—At each epoch of the training, a first run of the ANN through all the INPUT DATA samples is realized.

- As a result a matrix Mh is computed. Each row Xh of that matrix corresponds to the outputs of the last layer of the ANN, for a given INPUT DATA sample.
- The training data set is a matrix Mt where each row corresponds to the CLASS probabilities Xt for a given INPUT DATA sample
- The matrix K is approximated by a Kalman-Filtering technique so as to minimize the RMSE of $E=Xt-K\,Xh$ where E and Xt are vectors of size N (N being the number of CLASSES).
- Once the matrix K is approximated, the Back-Propagation is applied to the ANN for all the training data set samples, and the error is propagated through K first before being propagated through the network.

After these steps the training is completed.

2.2.5. Termination of the Training (See Step 1.9 and 1.10 on FIG. 1)

The end-user sets the number of training epochs for the NN. The training might stop earlier if the cross-validation error has begun to increase. If the final performances of the ANN are not satisfactory, the end-user can tune the ANN parameters and try a different configuration. One can also envisage a system where several configurations of the ANN are successively automatically tried and the best one retained.

A further component of the system is a Hidden Markov Model. A HMM is used to optimize the class stratigraphic sequence by choosing, for each set of input data a class that is the most probable and which has both a reasonable occurrence probability given the input data pattern and a reasonable occurrence probability given the previous estimated class.

3. The Hidden Markov Model Component

3.1. Training of the HMM

CLASS and CLASS transistion is preferably based on prior geological knowledge derived for example from core evaluation or evaluation of log data by experts. The knowledge is split into a CLASS probabilty distribution and CLASS transistion probabilities.

3.1.1. Automatic Training on the Cored/Geologist Defined Lithofacies Data (See Step 1.11 on FIG. 1)

The CLASS transition probability table depends only on the CLASSES of the learning set and it is therefore an absolute and static reference. It is computed by counting the successive CLASS transitions. It cannot be influenced by the neural predictions, and for a proper application of the Viterbi algorithm, it should be learnt on a large training set of facies log curves. It is possible to learn the CLASS transition table on a set of multiple wells, and in this case the CLASS transitions between two different wells are obviously not taken into account in the computation of the CLASS transition table.

Figure 4:
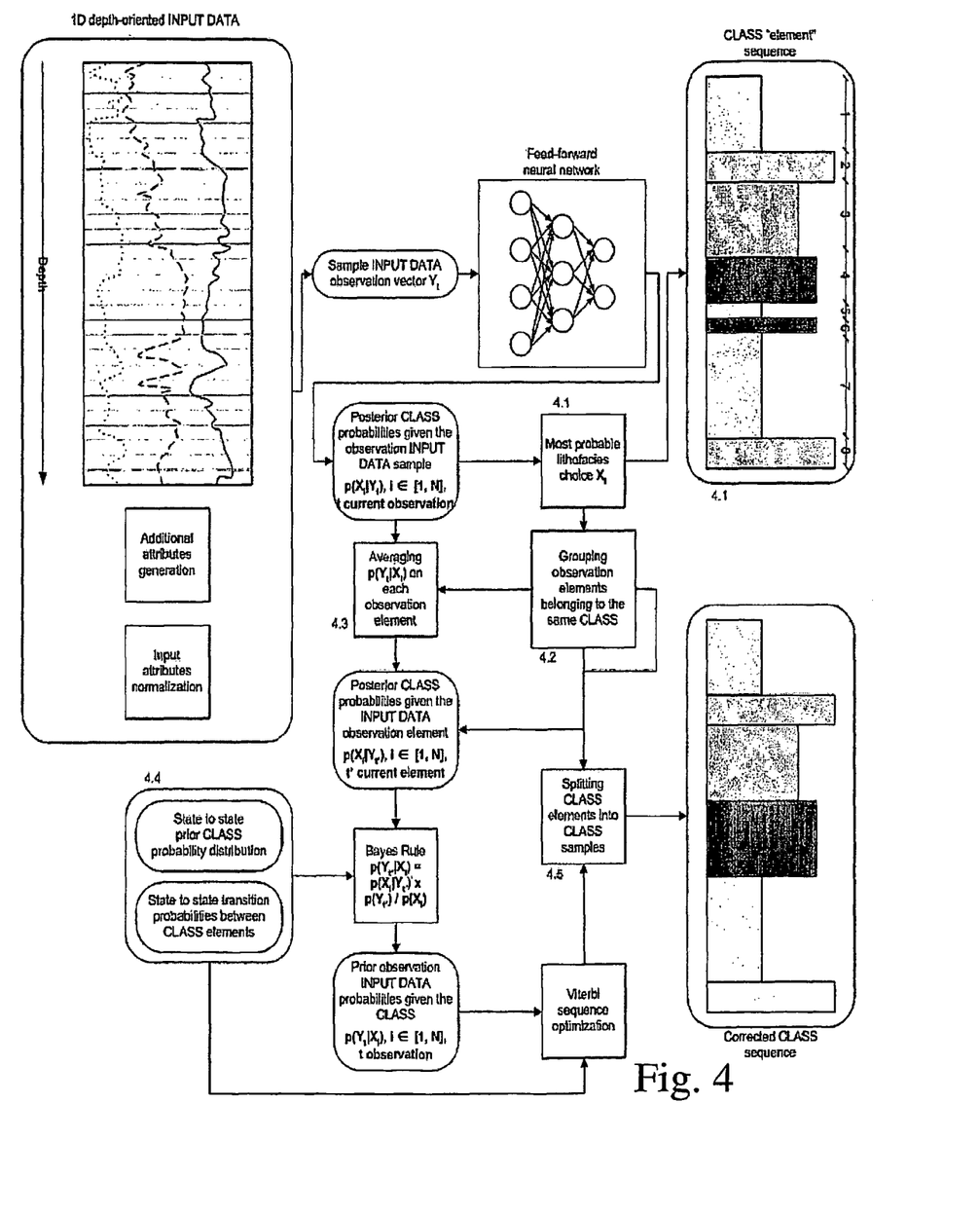
FIG. 4 depicts the same process as in FIG. 3, but with a state-to-state HMM instead of a sample-by-sample one.

These CLASS transitions can be counted on a sample-by-sample basis, (i.e. for each INPUT DATA sample), or on a state-to-state basis, grouping all the samples from the same CLASS together (see FIG. 4).

A similar automatic computation is done to approximate the CLASS probability distribution.

3.1.2. Geologist-Driven Correction of the HMM Model (See Step 1.12 on FIG. 1, 2.5 on FIG. 2, and 3.1 on FIG. 3)

Figure 3:
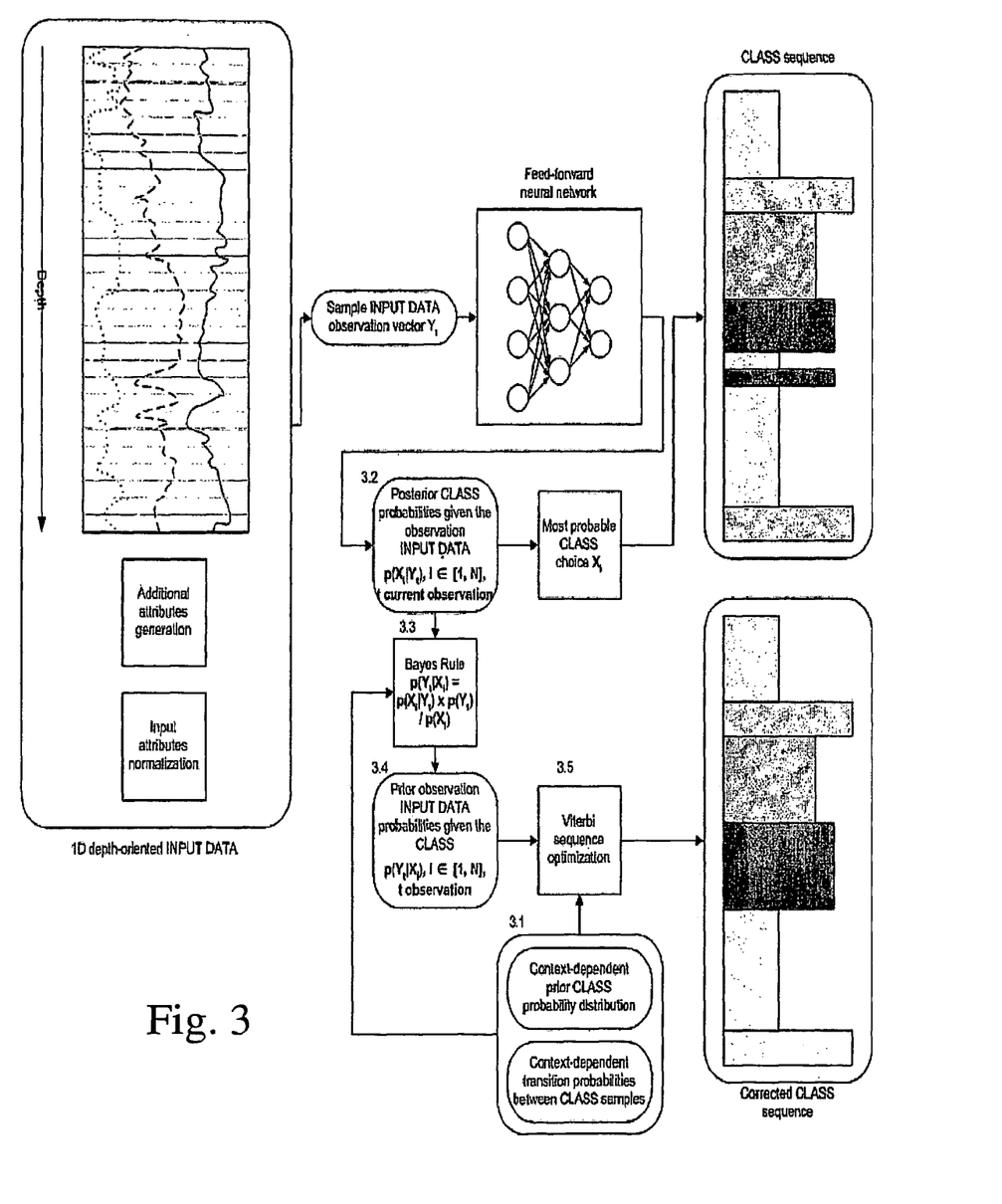
FIG. 3 is a block diagram of the Hybrid ANN-HMM processing chain in the geological classification estimation mode. The supervised, neural network module aims to predict the posterior class probabilities given an observation. The Viterbi processing optimizes the predicted class path.

This correction is performed based on the geologist's expert prior knowledge and can be done after the automatic estimation of the HMM on the learning data set, or before applying the HMM to a specific estimation data set of borehole logs. It relies on the CLASS transition probabilities, (and) the CLASS probability distribution. In case of rock facies classification, it can also rely on the lithofacies bed thickness which the geologist has defined in his geological study.

After the learning or training epoches probabilities derived from the HMM are combined with the neural network to generate a CLASS estimate. In the present example Bayesian statistics is used to estimate the CLASS based on availiable knowledge.

3.2. Combining HMM and ANN

3.2.1. Applying Bayes' Rule (See Step 3.2 to 3.4 on FIG. 3 and 2.6 to 2.7 on FIG. 2)

The ANN posterior CLASS probabilities estimator is designed to work independently from the observation set. Actually, this is a plain classifier, providing the probability $p(x_i)$ for each INPUT DATA sample. However, this can also be expressed as the posterior CLASS probabilities for each input data pattern given the current observation, $p(x_i|y)$.

A HMM model makes use of three different elements, which are: the state transition probabilities matrix, the state probability distribution, and the observation probability matrix given the current state $p(y|x_i)$. Those three elements are also required for the Viterbi algorithm described below.

In order to get $p(y|x_i)$, one needs to apply the Bayes Rule and to introduce the observation (INPUT DATA) probability distribution and the state (CLASS) probability distribution. However, as the INPUT DATA observations are continuous, and as for each depth step of the Viterbi algorithm that observation probability remains the same for all the possible CLASSES, one can just discard the $p(y)$ value.

3.2.2. Applying the Viterbi Optimization Algorithm (See Step 3.5 on FIG. 3 and 2.8 on FIG. 2)

At this stage, the hybrid ANN/HMM classification system has both a prior CLASS distribution, a CLASS transition probabilities matrix, and the posterior CLASS probabilities matrix, which depend on the time patterns and the observations. The Viterbi algorithm can be applied to those data, provided that the application of Bayes' rule will transform the posterior CLASS probabilities into prior observation probabilities given the previous CLASS and the time pattern.

It can be seen that there is no need to compute the markovian matrix of the observation probabilities given the CLASS. The Viterbi algorithm can therefore directly integrate the time-dependent observation probabilities given the current CLASS and the current time pattern. In other words, the state transition matrix and the state probability distribution have a static behavior (although they can be tuned to the context of the estimation) whereas the observation probabilities, given the previous CLASS, are depth-dependent.

3.2.3. State-To-State or Sample-By-Sample Classes Transitions (See FIG. 4)

In case of sample-by-sample classes transitions, the Viterbi algorithm is applied to all the INPUT DATA and associated estimated CLASSES probabilities samples.

In case of state-to-state transitions, all the consecutive samples which have in common the same most probable CLASS (see step 4.1), are grouped together (see step 4.2) and considered as an unique observation element. The CLASS probabilities of all the samples belonging to that element are also averaged (see step 4.3), and the Viterbi algorithm is then applied to the groups of observations and not to each observation sample.

The mean of computing the CLASS probabilities of the observation element can be either a plain mathematical average or a more complex average.

In order to perform a state-to-state Viterbi optimization, the state transition probabilities and the state distribution have also to be computed on a state-to-state basis and not on a sample-by-sample basis (see 3.1.1 and step 4.4 on FIG. 4).

After the Viterbi optimization, the observation elements are split into INPUT DATA samples again, and the CLASS curve is displayed on a sample-by-sample basis (see step 4.5 on FIG. 4).

4. Testing results

The simple ANN and the Hybrid ANN/HMM classifiers have been trained and tested on three different sets of geological data. As input data downhole logs were used, and as classification results, the rock facies classes.

4.1. Data Set 1 (Cored Logs)

The first data set used for the training contained 490 samples of 4 logs (DT, GR, NPHI and RHOB) and associated core facies (7 facies classes), r and were taken from real measurements performed in a well between the depth of 2975-3051 m.

Once trained, the hybrid system has been tested on the measurements from the same well between depths 2923-3161 m, which corresponded to 1562 samples from the same logs.

Whereas a single ANN system showed an amount of approximately 40 to 45% correct predictions, the hybrid ANN/HMM system reached an accuracy of 45 to 55%.

4.2. Data Set 2 (Cored Logs)

The data set used for the training contained 3800 samples of 5 logs (DT, GR, NPHI, RT and RHOB) and associated core facies (13 facies classes), and were taken from real measurements performed in 4 wells between the depth of 8000-9000 feet.

Once trained, the hybrid system has been tested on the measurements from 4 other wells of the same field, where core data were available. The accuracy of the results has been significantly increased.

4.3. Data Set 3 (Non-cored Logs)

In this example, the training data set contained about 2000 samples from one well. The testing data set contained between 1500 and 2000 samples per well in a field of 5 wells.

The lithofacies learning set for the Hybrid ANN/HMM system was provided by the results of electrofacies predictions of an unsupervised neural network classifier. The stability of the predictions of the latter systems has then been compared with the predictions of a plain ANN trained on the same lithofacies log curve.

The Hybrid ANN/HMM system is more reliable than a single ANN system in the terms of prediction accuracy and gave less noisy results; it will therefore provide better geological lithofacies log curve estimations.

The invention claimed is:

1. A system for inferring geological classes from downhole log data comprising a neural network for inferring class probabilities, characterized in that said system further comprises means for integrating class sequencing knowledge and optimising said class probabilities according to said sequencing knowledge, and storage for said inferred geological classes to establish a relationship between the inferred geological classes and the downhole log data, wherein said geological classes comprise one of lithology, rock type and petrophysical properties.

2. The system of claim 1, wherein the means for integrating class sequencing knowledge and optimising said class probabilities according to said sequencing knowledge comprises a hidden Markov model.

3. An automated system for inferring geological classes from downhole log data, comprising a data input vector, a neural network trained to infer from said input vector a class sequence or class probability vector, and a modifier for correcting said class sequence or class probability vector using prior knowledge of class sequence or class probability, and storage for said inferred geological classes to establish a relationship between the inferred geological classes and the downhole log data, wherein said geological classes comprise one of lithology, rock type and petrophysical properties.

4. An automated system of claim 3, wherein the modifier uses the prior knowledge of class probability distribution and class transition probability.

5. An automated system of claim 3, wherein the modifier includes a Viterbi sequence optimisation.

6. An automated system of claim 3, wherein the modifier includes a Bayesian based probability calculator.

7. An automated system of claim 3, wherein the modifier includes a Bayesian based probability calculator and a Viterbi sequence optimisation.

8. A method for inferring geological classes from downhole log data, comprising the following steps:
   inferring class probabilities with a neural network;
   integrating class sequencing knowledge and optimising said class probabilities according to said sequencing knowledge; and
   storing said inferred geological classes to establish a relationship between the inferred geological classes and the downhole log data, wherein said geological classes comprise one of lithology, rock type and petrophysical properties.

9. The method of claim 8, wherein the integrating class sequencing knowledge and optimising said class probabilities according to said sequencing knowledge is achieved according to a hidden Markov model.

10. A method for inferring geological classes from downhole log data, comprising the steps of generating a data input based on said well input data; using a neural network to generate a class sequence or class probability vector inferred from said input; correcting said class sequence or class probability vector using prior knowledge of class sequence or class probability; and storing said inferred geological classes to establish a relationship between the inferred geological classes and the downhole log data, wherein said geological classes comprise one of lithology, rock type and petrophysical properties.

11. The method of claim 10, wherein prior knowledge of class probability distribution and class transition probability is used to correct the class sequence or class probability vector.

12. The method of claim 10, wherein the correction includes a Viterbi sequence optimisation.

13. The method of claim 10, wherein the correction includes a Bayesian based probability calculation.

14. The method of claim 10, wherein the correction includes a Bayesian based probability calculation and a Viterbi sequence optimisation.

* * * * *